United States Patent [19]
Mikulak

[11] 3,849,240
[45] Nov. 19, 1974

[54] SELF SEAL SYSTEM FOR THE INSTALLATION OF INSULATION

[75] Inventor: John Paul Mikulak, Minneapolis, Minn.

[73] Assignee: Johns-Manville Corporation, New York, N.Y.

[22] Filed: Jan. 19, 1970

[21] Appl. No.: 3,638

[52] U.S. Cl................. 161/167, 138/149, 161/247, 138/170
[51] Int. Cl........................... B32b 27/42, C09j 7/00
[58] Field of Search........... 138/149, 151, 152, 170, 138/DIG. 1, DIG. 7, DIG. 10; 260/845; 156/2, 84, 308, 333, 335; 117/63, 122 S; 161/167, 247

[56] References Cited
UNITED STATES PATENTS

| 231,832 | 8/1880 | Merriam | 138/149 X |
| 1,613,725 | 1/1927 | Sabin | 138/149 X |
| 2,405,330 | 8/1946 | Ryder | 138/149 X |
| 2,610,910 | 9/1952 | Thomson | 260/845 X |
| 2,906,317 | 9/1959 | Keyes | 138/149 X |
| 2,918,442 | 12/1959 | Gerrard | 260/845 X |
| 2,925,021 | 2/1960 | Baste | 138/170 X |

Primary Examiner—Richard C. Queisser
Assistant Examiner—Daniel M. Yasich
Attorney, Agent, or Firm—John A. McKinney; Robert M. Krone; John D. Lister

[57] ABSTRACT

Fibrous insulating bodies are joined and sealed to each other by tabs extending from their margins and having precoated, non-tackey and activatable adhesive coatings which can be activated when convenient, upon installation of the bodies in the position and condition of ultimate use, the adhesive is activated by localized application of activator fluid to the precoated tab areas and engagement of the tackey tab surfaces with the surface of the adjacent body with which the seal is to be made. Augmenting seals can be made by separate sheet or tape elements having a face precoated with the activatable adhesive.

1 Claim, 2 Drawing Figures

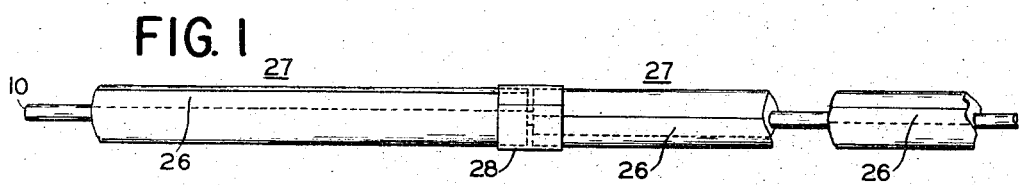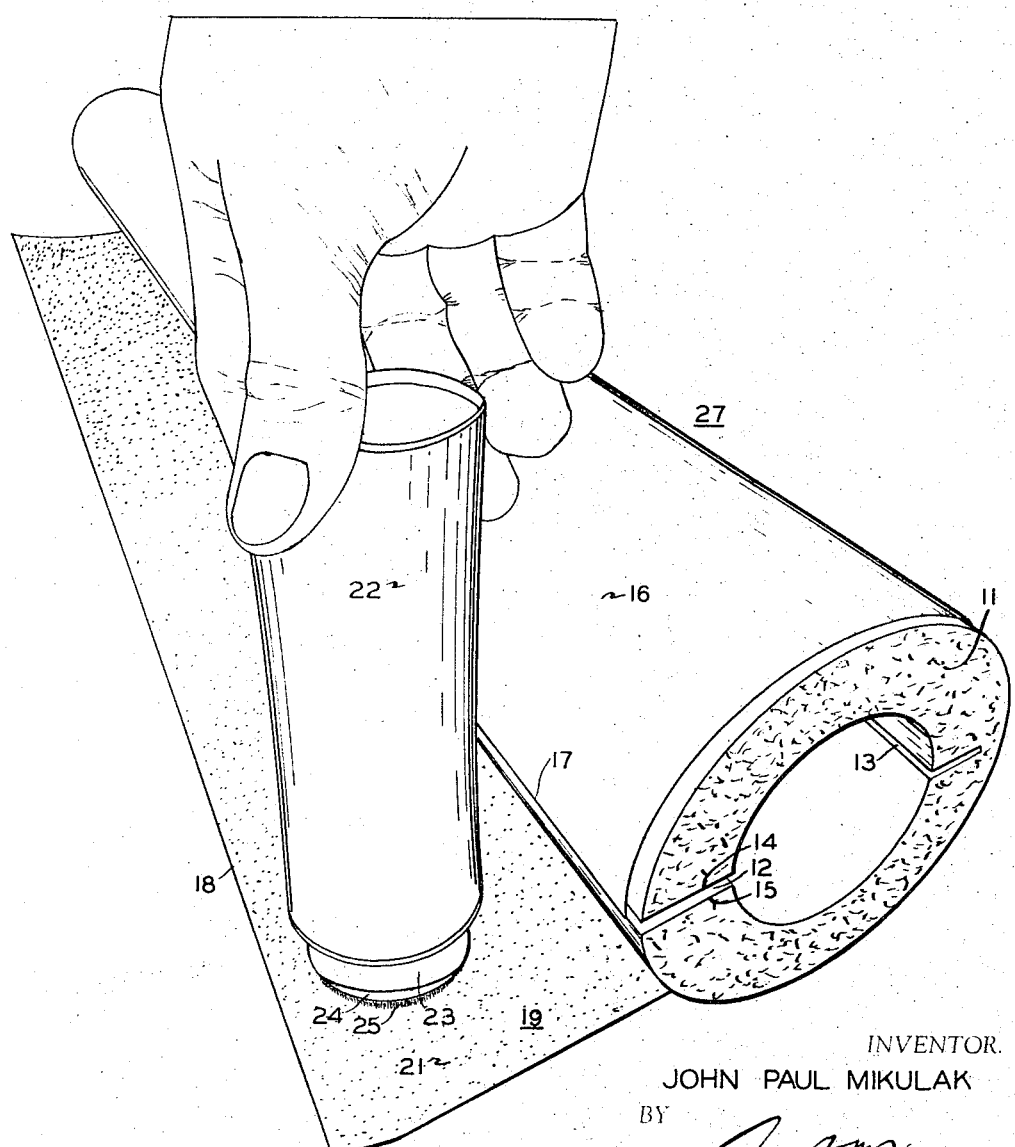

SELF SEAL SYSTEM FOR THE INSTALLATION OF INSULATION

CROSS-REFERENCE TO RELATED APPLICATIONS

The jacketed form of pipe insulation which can be employed in the system of this application is produced on the apparatus and in accordance with the method disclosed in the application of John Marvin Current and Rodney Roger Smalley filed herewith, Ser. No. 3,598, and now U.S. Pat. No. 3,695,965, entitled "Method and Apparatus for Feeding and Wrapping Sheet Material."

BACKGROUND OF THE INVENTION

This invention relates to a self-seal system for the installation of insulation and particularly to a system for joining the abutting margins of bodies of thermal insulation after they have been mounted for ultimate use.

Heretofore, building insulation, insulated duct board and pipe insulation have been joined by tapes applied with adhesive. These have included liquid adhesives applied in the field to the joining tape upon installation or assembly of the insulation or duct. Such applications required much time and effort and frequently involved a messy operation. Pressure sensitive adhesive tape has also been employed although the bonding ability of such tape is impaired greatly by dirt or dust, the tape and adhesive is flammable and the adhesive is ineffective in cold weather (50°F and below).

SUMMARY OF THE INVENTION

This invention involves a joining sheet member which is factory coated with a dormant and reactivatable adhesive whereby the adhesive is activated in the field only after the elements to be joined are assembled or mounted in their final position. Advantageously, the sheet material can be secured to one of the elements to be bonded. Activation of the adhesive can be by a liquid from a suitable applicator such as a can or plastic bottle having a flow controlling applicator surface for metering liquid to the surface.

In one embodiment of the invention as applied to thermal insulation for pipes, longitudinally split tubes of fibrous mat are jacketed with a sheet material having a lap or tab extending along the slit and of sufficient width to span the slit. The lap is located with a factory applied activatable adhesive which is not tackey until an activator liquid is applied. The insulating tube is positioned over a pipe by spreading the slit to admit the pipe and is sealed thereon by applying activator liquid to the lap and, when its inner surface becomes tackey, pressing it to the jacket on the opposite side of the closed slit. Sealed joints can be made either by sheet material integral with the jacket and protruding beyond one end of the underlying insulating tube by telescoping the protruding material over the adjacent and abutting section of insulation, applying activator fluid and contacting the abutting section with the tackey face of activated adhesive, or by applying a separate tape coated with the activatable adhesive to span and contact the abutting ends after it has been activated and become tackey.

In other embodiments, insulating duct board can be covered with an adhering, gas impervious sheet material whereby a marginal portion extends beyond the edge of the board and is coated with an activatable adhesive so that upon assembly of board panels into ductwork, they can be joined by activating the adhesive and pressing it against adjacent panels or coating sheet material.

DESCRIPTION OF THE DRAWINGS

FIG. 1 shows in elevation several sections of jacketed thermal insulation installed on a length of pipe with two abutting sections sealed together;

FIG. 2 is a perspective of a section of tubular material illustrating the application of activator to a sealing tab secured to the tube.

DESCRIPTION OF A PREFERRED EMBODIMENT

The sealed insulating system of this invention comprises an insulating body of a fibrous insulating material which most commonly is formed of glass fibers produced by passing glass filaments through small orifices in pots containing molten glass. The filaments are subjected to hot gaseous blasts which soften and attenuate the filaments into small lengths of individual fine fibers. The fibers are collected on a moving formation conveyor and a binder, typically a thermosetting resin, is introduced into the mat. The mat can be compacted to a desired density and thickness for flat board, either as single or multiple superposed layers, for circular duct or pipe insulation, it can be formed into cylinders by being cut into predetermined lengths corresponding to the length of the total number of convolutions to be employed in the cylinder and then wrapped around and compressed upon a mandrel to form the cylinder having the desired inner and outer diameter and density.

Although glass fibers formed as above are preferred due to their ease of formation, availability in desired lengths and diameters, and reasonable cost, other common materials which can be fiberized as by usual means of spinning, drawing, attenuating, blowing and so forth into fine diameter fiber can be employed exclusively or in part in the formation of the mat. These may include known products manufactured from various source materials of silicates of metal oxides, such as rock wools from argillaceous matter or shale, slag wool from metallurgical slags, each commonly referred to as "mineral wools," aluminum silicate fibers and any fibers of the so-called glasses.

As shown in FIGS. 1 and 2 the system of the invention is applied to thermal pipe insulation installed on a length of pipe 10 in FIG. 1 and wherein the insulating body 11 is a cylinder preformed of glass fiber mat as above having a longitudinally severed wall as at slit 12 with diametrically opposed longitudinal slit 13 providing a flexible section to permit spreading the adjacent margins 14 and 15 of slit 12 when the cylinder is placed over the pipe 10. A jacket 16 which can be of sheet material made up of a multiplicity of layers, as paper, an overlying web of glass fibers as reenforcement, and a metallic foil, is secured to the outer face of cylinder 11 with a first longitudinal margin 17 adjacent the margin 14 of slit 12 and the opposed longitudinal margin 18 on a tab or flap 19 which is free of the cylinder in the vicinity of slit margin 15. Thus the slit 12 remains exposed and available for admission of the pipe upon which the insulation is to be applied.

A seal of the jacket and the maintenance of the insulation on the pipe is effected by adhering the tab or flap 19 as a lap area to the cylinder and jacket 16 on the opposite side of the slit 12 so that it spans the slit and holds it closed. Adhesion is by a factory-applied adhesive on the inner face of flap 19 either over the entire face or over a band 21 in the region which can be contacted on the opposite side of slit 12. The adhesive is of a dormant or non-tackey nature under normal conditions of transportation, handling and installing so that it is easily handled without picking up foreign matter which might impair the bond, and can be conveniently packaged without undesired adhesion of the insulation lengths. Further, installation is accomplished merely by activating the adhesive on the inner face of flap 19 and pressing its tackey surface against the face 16 to which it is to be bonded.

Adhesive which is soluble in either a water-base or compound chemical base is employed. In most construction utilizations it is advantageous to employ adhesives of the phenolic neoprene type. The adhesive should be dormant, readily activated and not flammable. The adhesive is factory applied as a coating and dried prior to packaging. In the field the dry adhesive coating is reactivated by a suitable solvent which could be water or an organic activating fluid such as acetone, toluene, trichloroethane or methyl chloroform applied to the self-seal areas from a flow-controlled applicator. The solvent is effective under installation conditions of temperature and humidity to render the adhesive tacky for a sufficient interval to effect the seal and to evaporate so that the sealed area dries to a non-tackey condition in due course.

As shown in FIG. 2, the activating liquid can be applied from a can 22 having a cap 23 including a limited aperture (not shown) covered by a fabric 24 having a pile or nap 25 providing an applicator surface for spreading the activator fluid. The nap 25 is wiped across the band 21 of dormant adhesive after or while the can is inverted to moisten the fabric or meter its flow to distribute the activator over that band. Alternative solvent applicators can be employed for activating the adhesive such as brushes, sponges and wiping cloths.

The longitudinal lap seal 26 is augmented in forming a length 27 of sealed insulation by a butt seal by wrapping tape 28 bearing factory applied adhesive on its innter face around the region of abutting ends of the insulating sections 27 of FIG. 1. The adhesive on tape 28 is activated by the solvent from applicator 22 as in the case of the lap seal just prior to its application to the abutting portions.

Another application of the dormant, precoated, activatable adhesive to an insulating duct is for rectangular duct made up of flat panels of insulating board (not shown). In such constructions a gas barrier in the form of a paper, fabric or foil sheet or combination of layers forming a sheet is applied to the outer face board with at least one marginal portion of the sheet extending beyond the underlying board. The extending portion is precoated with adhesive so that it can be activated as described in the case of the pipe jacket lap. Thus, upon assembly of the board into ducts of polygonal cross-section each side can be sealed to its adjacent and abutting side by applying liquid activator to activate the adjesive on the extension of sheet material along its margin. Alternatively, tape with an activatable adhesive on its inner face can be employed to bridge one or more of the abutting margins of the insulating board.

What is claimed is:

1. A thermal insulating element comprising a body of fibrous thermal insulation mat having a major face; a flap of flexible sheet material overlying a portion of a major face of said body and extending from a margin of said body; an adhesive of the phenolic neoprene type on said sheet material securing said sheet material to said body; and a dormant layer of said adhesive secured to an extending face of said flap, said dormant layer of said adhesive being capable of adhesive activation by an organic activating solvent whereby said flap can be adhered to an adjacent surface which it overlays.

* * * * *